US008393868B2

(12) United States Patent
Vettese

(10) Patent No.: US 8,393,868 B2
(45) Date of Patent: Mar. 12, 2013

(54) SUPPORT SPINE FOR A WIND TURBINE BLADE

(75) Inventor: Sharolyn Vettese, North York (CA)

(73) Assignee: Wind Simplicity, Inc., North York, Ontario (CA)

( * ) Notice: Subject to any disclaimer, the term of this patent is extended or adjusted under 35 U.S.C. 154(b) by 688 days.

(21) Appl. No.: 12/610,768

(22) Filed: Nov. 2, 2009

(65) Prior Publication Data

US 2011/0103959 A1    May 5, 2011

(51) Int. Cl.
*F03D 11/04*    (2006.01)
(52) U.S. Cl. .................. 416/210 R; 416/226; 416/241 A
(58) Field of Classification Search .............. 416/204 R, 416/210 R, 226, 241 A
See application file for complete search history.

(56) References Cited

U.S. PATENT DOCUMENTS

| 4,936,751 A | * | 6/1990 | Marshall | 416/246 |
| 5,486,094 A | * | 1/1996 | Davis et al. | 416/210 R |
| 6,042,339 A | * | 3/2000 | Blateri et al. | 416/219 A |
| 6,494,682 B1 | * | 12/2002 | Blateri et al. | 416/206 |
| 6,644,925 B1 | * | 11/2003 | Collmar | 416/210 R |

* cited by examiner

*Primary Examiner* — Igor Kershteyn
(74) *Attorney, Agent, or Firm* — Shoemaker and Mattare

(57) ABSTRACT

According to embodiments described in the specification, a support spine for a wind turbine blade is provided, comprising an anchor member having a proximal end and a distal end, a transition member extending from the distal end of the anchor member, the transition member having a distal end, and a blade support member extending from the distal end of the transition member. At least a portion of the anchor member can be configured for coupling to a rotor drum. The support spine has a reduced cross-sectional area at the distal end of the transition member than at the distal end of the anchor member. The support spine can support one or more wind turbine blades.

14 Claims, 7 Drawing Sheets

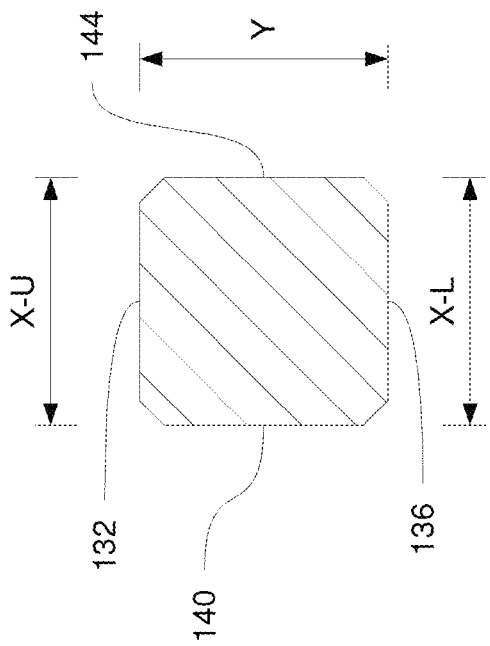
Figure 5A
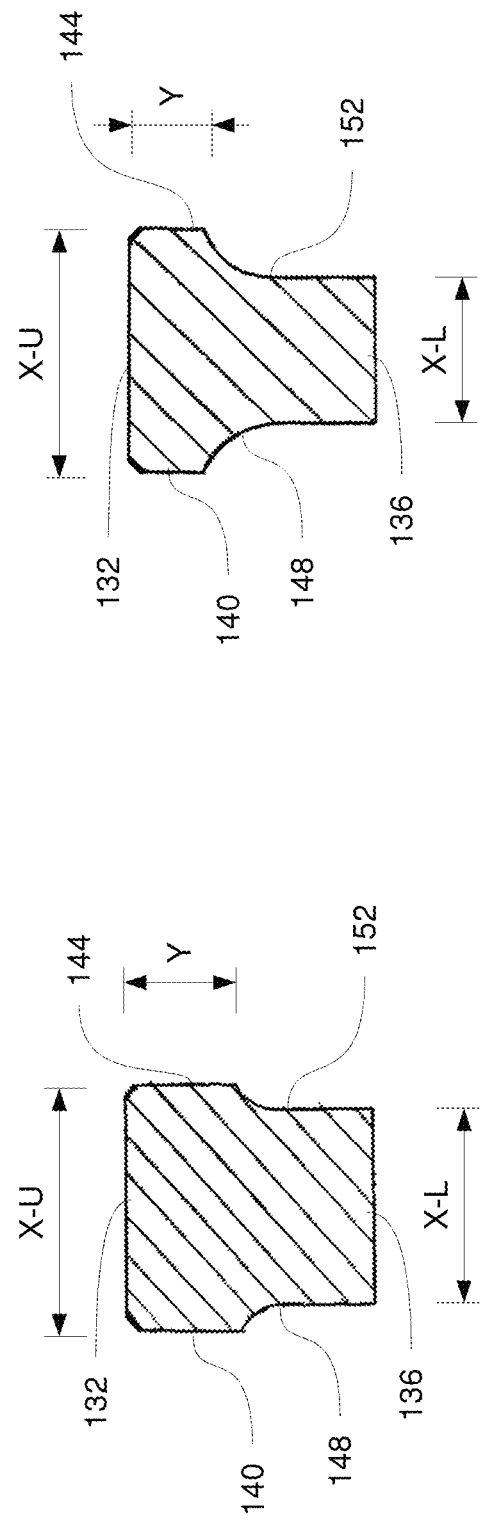
Figure 5C
Figure 5B

SUPPORT SPINE FOR A WIND TURBINE BLADE

FIELD

The specification relates generally to wind turbines, and specifically to a support spine for a wind turbine blade.

BACKGROUND

In the area of power generation, governments and individuals are pursuing the development of electricity generated from the wind. This is partly due to increased awareness of the ecological impact modern societies exert on the environment, but also due to the increasing cost of traditional non-renewable energies. Typically, modern wind turbines used in large-scale installations consist of three long, narrow blades extending directly from a hub mounted on a tower located in wind farms that are some distance away from urban centres.

There is a growing interest in smaller-scale wind energy capture, which can be better suited to rural or urban applications. Wind turbines for such applications can be smaller, and can have discrete blades such as those described, for example, in Applicant's copending U.S. Published Application No. 2009/0104039, the entirety of which is incorporated herein by reference. The blades can be attached to a hub by an arm, or beam. See, for example, Applicant's co-pending U.S. Published Application No. 2009/0016887, the entirety of which is incorporated herein by reference.

Both the large-scale and smaller-scale wind turbine designs face the conflicting challenges of requiring strength but not excessive weight in the blades. A longer blade provides a larger sweep area, but the blade also becomes heavier and thus subject to greater stresses, particularly at the hub of the wind turbine.

SUMMARY

According to an aspect of the specification, a support spine for a wind turbine blade is provided, the support spine comprising: an anchor member having a proximal end and a distal end, at least a portion of the anchor member being configured for coupling to a rotor drum; a transition member extending from the distal end of the anchor member, the transition member having a distal end; a blade support member extending from the distal end of the transition member; wherein the support spine has a reduced cross-sectional area at the distal end of the transition member than at the distal end of the anchor member.

The support spine can further comprise substantially planar, substantially parallel opposing upper and lower surfaces, the upper and lower surfaces extending along the lengths of the anchor, transition and blade support members; a pair of substantially planar, substantially parallel opposing side surfaces substantially perpendicular to the upper and lower surfaces, the side surfaces extending along the lengths of the anchor, transition and blade support members; wherein a width of the lower surface decreases along the length of the transition member.

The support spine can further comprise a pair of concave surfaces, each concave surface joining the lower surface with a different one of the side surfaces along the lengths of the transition and blade support members. A height of each of the side surfaces can decrease along the length of the transition member in the direction of the distal end of the transition member. The heights of the side surfaces can be substantially equal. The height of each of the side surfaces can further decrease along the length of the blade support member in the direction of the distal end of the blade support member.

The anchor member can have a substantially rectangular transverse cross-section. Alternatively, the anchor member can have a substantially square transverse cross-section.

At least a portion of the upper surface of the blade support member can be configured for contacting a wind turbine blade. The upper surface of the blade support member can alternatively be configured for contacting more than one wind turbine blade. The blade support member can comprise a plurality of fastener holes extending therethrough and arranged longitudinally along the blade support member. The anchor member, transition member and blade support member can be integrally formed from a single piece of material. The material can be selected from the group consisting of metal, plastic and wood. The material can comprises a metal. The material can comprise aluminum.

BRIEF DESCRIPTIONS OF THE DRAWINGS

Embodiments are described with reference to the following figures, in which:

FIGS. 5A-5C depict sectional elevational views of the support spine of FIG. 1, according to a non-limiting embodiment;

DETAILED DESCRIPTION OF THE EMBODIMENTS

Figure 1:
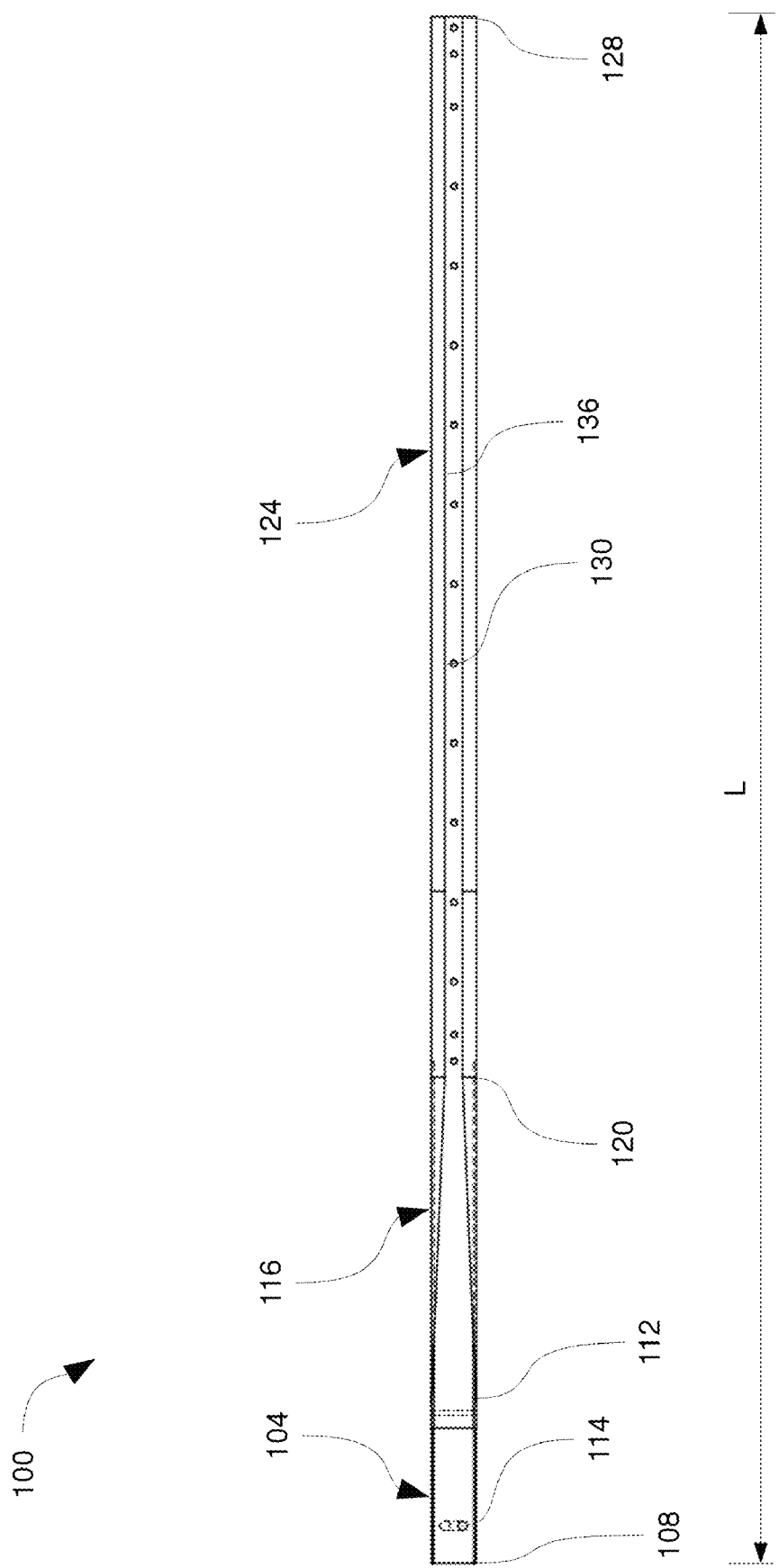
FIG. 1 depicts a plan view of a support spine for a wind turbine blade, according to a non-limiting embodiment.

Referring now to FIG. 1, a support spine 100 is depicted, having a total length indicated as "L." Support spine 100 can include a plurality of members. In the present embodiment, support spine 100 can include an anchor member 104 having a proximal end 108 and a distal end 112. For installation purposes (as will be discussed below with reference to FIGS. 3 and 4), anchor member 104 can have one or more fastener holes 114 extending therethrough for receiving bolts, screws or any other suitable fastening mechanism. The length of anchor member 104 is a portion of length L bounded by proximal end 108 and distal end 112.

Support spine 100 can further include a transition member 116 coupled to distal end 112 of anchor member 104. Transition member 116 has a proximal end and a distal end 120. It will now be apparent to those skilled in the art that the proximal end of transition member 116 coincides with (i.e. is at the same location as) distal end 112 of anchor member 104. For the sake of simplicity, that location is numbered only once and will be referred to simply as distal end 112 of anchor member 104. The length of transition member 116 is also a portion of length L, bounded by distal end 112 of anchor member 104 and distal end 120.

Support spine 100 can further include a blade support member 124 coupled to distal end 120 of transition member 116. Blade support member 124 includes a proximal end (which coincides with distal end 120 and is therefore not numbered for reasons similar to those discussed above) and a distal end 128. For installation purposes, blade support member 124 can include a plurality of fastener holes 130 extending therethrough for receiving fasteners such as bolts or screws. Fastener holes 130 can be aligned with each other substantially in parallel with length L of support spine 100. As with the previous members, the length of blade support member 124 is a portion of length L, bounded by distal end 120 of transition member 116 and distal end 128.

In the present embodiment support spine 100 can thus include anchor member 104, transition member 116 and blade support member 124. The three members of support spine 100 can be integrally formed from a single piece of suitable material such as a metal, to form a single elongated structure. In the present embodiment, support spine 100 comprises a single, solid (that is, not hollow with the exception of fastener holes 114 and 130) piece of aluminum. Transition member 116 extends from distal end 112 of anchor member 104, while blade support member 124 extends from distal end 120 of transition member. The three members lie along substantially the same longitudinal axis which is parallel to length L. As will be discussed below in greater detail, support spine 100 has a transverse cross-sectional area (taken in a plane substantially perpendicular to length L) that decreases over length L as a result of the varying shapes of anchor member 104, transition member 116 and blade support member 124. In general, the cross-sectional area is greater at proximal end 108 of anchor member 104, and smaller at distal end 128 of blade support member 124.

Figure 2:
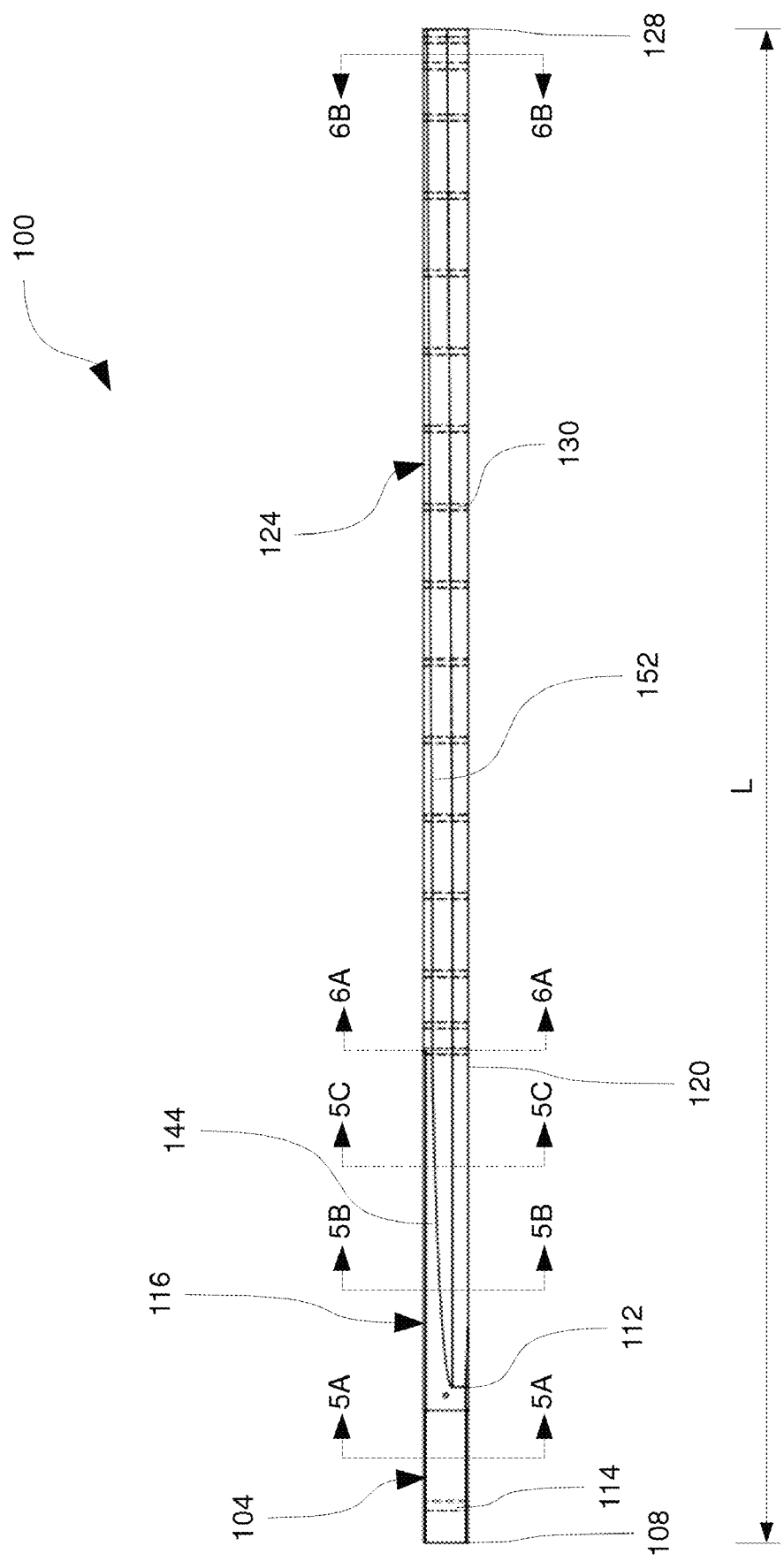
FIG. 2 depicts a side elevational view of the support spine of FIG. 1, according to a non-limiting embodiment.

Referring briefly to FIG. 2 which depicts a side view of support spine 100, the location of distal end 112 of anchor member 104 is clearly visible as a point at which a change in the external dimensions of support spine 100 occurs. Because the change is gradual, it is more readily identified in the side view of FIG. 2, though it is also clearly present in FIG. 1. FIG. 2 also clearly shows that fastener holes 114 and 130 extend directly through anchor member 104 and blade support member 124, respectively.

Figure 3:
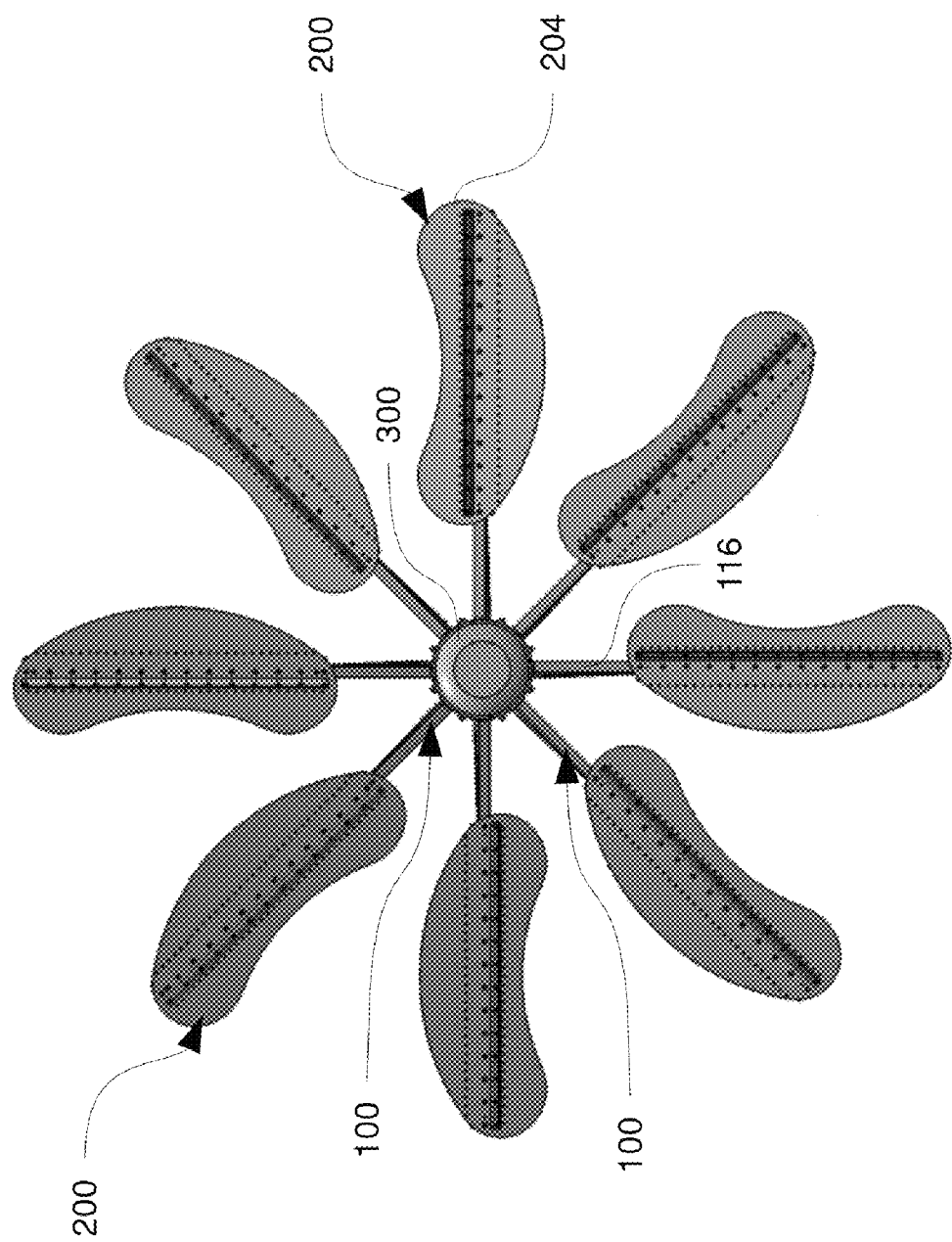
FIG. 3 depicts the support spine of FIG. 1 in an installed state, according to a non-limiting embodiment.

Brief reference will now be made to FIGS. 3 and 4 which depict support spine 100 in installed and partially installed states. In FIG. 3, an exemplary partial wind turbine assembly is shown. The partial wind turbine assembly includes a rotor hub 300 for mounting on a tower (not shown) to elevate the wind turbine assembly as desired. The partial wind turbine assembly also includes a plurality of support spines 100 coupled to rotor hub 300. Each support spine 100 supports one of a plurality of wind turbine blades 200 at a desired distance from rotor hub 300. It will be understood that rotor hub 300 and wind turbine blades 200 are depicted for establishing terminology with respect to support spine 100 and are not intended to limit the structure of support spine 100 in any way.

When support spine 100 is installed as shown in FIG. 3, at least a portion of anchor member 104 is received within rotor hub 300 to couple support spine 100 to rotor hub 300. In the particular embodiment shown in FIG. 3, the entirety of anchor member 104 is received within rotor hub 300 (though it will be appreciated that this is not strictly necessary) and fasteners such as bolts can be inserted into fastener holes 114. Support spine 100 thus exits rotor hub 300 at or before distal end 112 of anchor member 104, and transition member 116 is visible between rotor hub 300 and wind turbine blade 200. It will now be apparent to those skilled in the art that the terms "proximal" and "distal" as used herein refer to positions relative to the center of rotor hub 300. That is, "proximal" refers to a position along support spine 100 that is closer to the center of rotor hub 300, while "distal" refers to a position further from the center of rotor hub 300.

Figure 4:
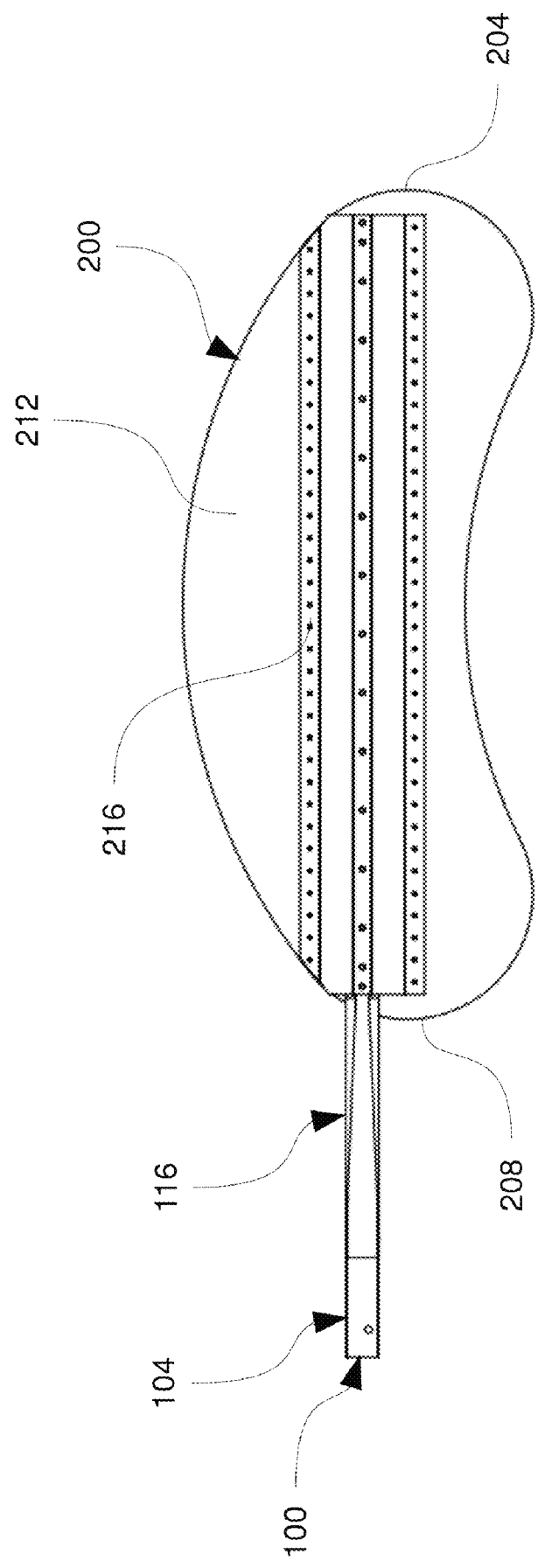
FIG. 4 depicts the support spine of FIG. 1 in a partially installed state, according to a non-limiting embodiment.

The coupling between support spine 100 and wind turbine blade 200 is shown in greater detail in FIG. 4, where support spine 100 is depicted in a partially installed state without rotor hub 300 (anchor member 104 is thus fully visible). Wind turbine blade 200 includes a tip 204 and a counter tip 208 opposite tip 204. Wind turbine blade 200 also includes a leeward surface 212 and an opposing windward surface (not visible in FIG. 4 as it is "facing away" from the reader). At least a portion of blade support member 124 is coupled to leeward surface 212 of wind turbine blade 200 by way of a blade cover 216. Blade cover 216 and wind turbine blade 200 include holes that line up with fastener holes 130, and thus blade cover 216, blade support member 124 and wind turbine blade 200 can be coupled by way of bolts or other fasteners being inserted through fastener holes 130 and corresponding holes in blade cover 216 and wind turbine blade 200. In the particular embodiment shown in FIG. 4, the entirety of blade support member 124 is received within blade cover 216, though this is not strictly necessary. It will now be apparent to those skilled in the art that use of the terms, "upper" and "lower" herein will refer to positions relative to leeward surface 212 of wind turbine blade 200. That is, "upper" will refer to a position closer to leeward surface 212, while "lower" will refer to a position further from leeward surface 212, in a direction substantially perpendicular to leeward surface 212.

The changes in cross-sectional area of support spine 100 referred to above will now be described in greater detail with reference to FIGS. 5A-5C and 6A-6B. The locations of the transverse cross-sections of FIGS. 5A-5C and 6A-6B are indicated in FIG. 2.

Turning first to FIG. 5A, a cross-section of anchor member 104 is shown. From the cross-section it can be seen that support spine 100 includes an upper surface 132 and a lower surface 136. As best seen in FIG. 1, lower surface 136 is a substantially planar surface extending along the length L of support spine 100. Thus, each member of support spine 100 defines a portion of lower surface 136 (and, likewise, of upper surface 132, also substantially planar and extending along the length L of support spine 100). Returning to FIG. 5A, upper surface 132 and lower surface 136 form a first pair of opposing (that is, on opposite sides of support spine 100) substantially parallel surfaces.

Support spine 100 also includes a second pair of opposing, substantially parallel surfaces, formed by side surfaces 140 and 144. As best seen in FIG. 2, side surface 144 is a substantially planar surface extending along the length L of support spine 100 (as is side surface 140, though it is not visible in FIG. 2). It will now be apparent to those skilled in the art that in FIG. 5A upper and lower surfaces 132 and 136 have substantially equal widths "X-U" and "X-L." Similarly, side surfaces 140 and 144 have substantially the same height "Y." Further, it will be appreciated that upper and lower surfaces 132 and 136 are substantially perpendicular to side surfaces 140 and 144. In other words, anchor member 104 has a substantially rectangular transverse cross-section and thus has a substantially equal cross-sectional area along its length. In the present embodiment, anchor member 104 has a substantially square cross-section, though this is not strictly necessary. In addition, the corners of anchor member 104 can be chamfered as shown in FIG. 5A. In order to ensure a secure fit with rotor hub 300 or any other component to which anchor member 104 is to be secured, anchor member 104 can be fabricated with more precisely controlled dimensions than the remainder of support spine 100.

FIG. 5B depicts a first cross-section of transition member 116. In general, the cross-sectional area of transition member 116 decreases along its length from distal end 112 of anchor member 104 towards distal end 120 of transition member 116. In FIG. 5B, the width X-U of upper surface 132 remains substantially unchanged. The width X-L of lower surface 136, however, is reduced. In addition, the height Y of side surfaces 140 and 144 is reduced. Thus, the area of the cross-section depicted in FIG. 5B is smaller than that of the cross-section depicted in FIG. 5A. It will now be apparent that while upper surface 132 remains joined to side surfaces 140 and 144 as in FIG. 5A, the reductions in the dimensions of side surfaces 140 and 144 as well as lower surface 136 means that lower surface 136 is no longer directly joined to side surfaces 140 and 144. Instead, lower surface 136 is joined to side surfaces 140 and 144, respectively, by a first concave surface 148 and a second concave surface 152. Concave surface 152 can be seen in FIG. 2 as beginning on transition member 116 and extending to distal end 128 of blade support member 124. The term "concave" as used herein is intended to refer broadly to a surface that tends generally inwards, towards the center of a cross-section of support spine 100.

FIG. 5C depicts a second cross-section of transition member 116, taken at a point distal to the cross-section of FIG. 5B. Therefore, the cross-section of FIG. 5C has a still smaller area than that of FIG. 5B. In particular, the width X-L of lower surface 136 is further reduced, as is the height Y of side surfaces 140 and 144. It will be appreciated that the width X-U of upper surface 132 can remain substantially unchanged.

It will now be apparent to those skilled in the art that in general, the width X-L of lower surface 136 and the height Y of side surfaces 140 and 144 can both gradually change over the length of transition member 116, until desired widths and heights are reached. This can be clearly seen, for example, in FIG. 1, where lower surface 136 becomes narrower over the length of transition member 116 and then remains substantially unchanged over the length of blade support member 124. It will also be noted that upper surface 132 of transition member 116 can be chamfered to control the aerodynamic properties of transition member 116, as shown in FIGS. 5B and 5C.

Figure 6A:
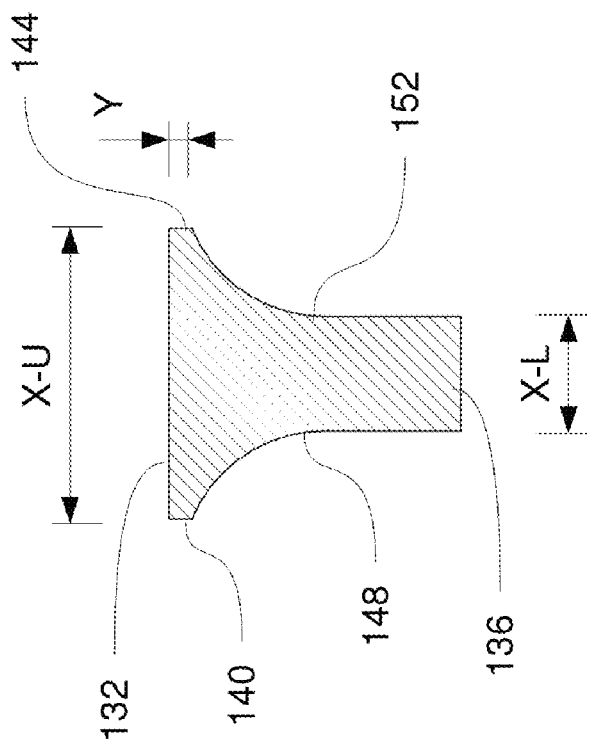
FIGS. 6A-6B depict further sectional elevational views of the support spine of FIG. 1, according to a non-limiting embodiment.
Figure 6B:
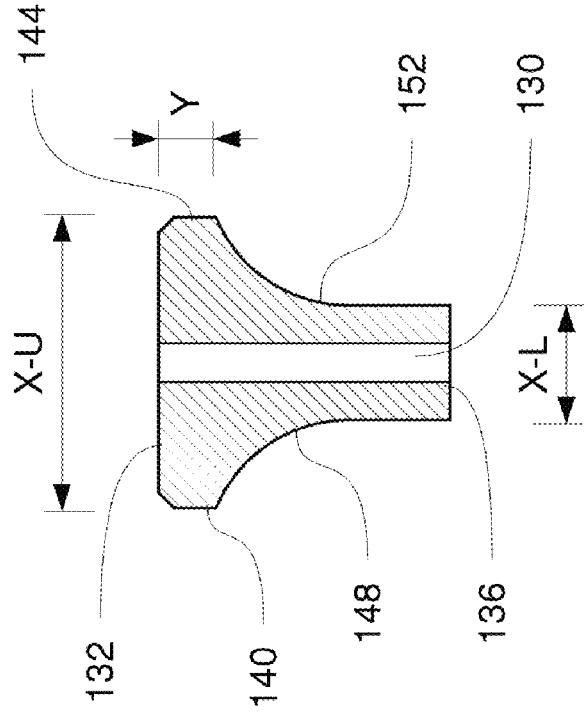

Referring now to FIGS. 6A and 6B, transverse cross-sections of blade support member 124 are shown. In particular, FIG. 6A is a cross-section taken near distal end 120 of transition member 116. One of fastener holes 130 is visible, extending between upper surface 132 and lower surface 136. It will now be appreciated that the final desired value of width X-L of lower surface 136 (which has been reached at distal end 120 of transition member 116) can be chosen to provide sufficient material around fastener holes 130 so as to retain sufficient strength in blade support member 116. It will be noted that at least a portion of blade support member 124 can be chamfered at upper surface 132, similarly to transition member 116.

Referring now to FIG. 6B, a further cross-section, taken closer to distal end 128 than the cross-section of FIG. 6A, is shown. It will be noted that the distal portion of blade support member 124 is not chamfered, though of course this is not a strict requirement. The width X-L of lower surface 136 remains substantially unchanged along the length of blade support member 124, and thus is substantially equal to the width X-L shown in FIG. 6A. However, in the present embodiment the height Y of side surfaces 140 and 144 is further decreased, resulting in a further reduction of the cross-sectional area of support spine 100 over the length of blade support member 124.

It will now be apparent to those skilled in the art that upper surface 132 of blade support member 124 is configured to contact leeward surface 212 of wind turbine blade 200 when installed. Lower surface 136, on the other hand, is configured to contact blade cover 216.

It will be appreciated that variations can be made to the present embodiment. For example, various materials can be used for any or all of the members of support spine 100. In particular, any or all members of support spine 100 can be manufactured from metals, including aluminum, steel and other suitable metals, as well as various woods and plastics. While in the present embodiment, anchor member 104, transition member 116 and blade support member 124 are integrally formed from a single piece of material, it will be understood that this is not necessary. Individual members can be manufactured separately from the same or different materials, and joined at a later time by any of a variety of fasteners (e.g. welds, solders, glue, bolts and the like).

Further variations are possible with respect to the dimensions of support spine 100 and its members. Support spine 100 can have a wide variety of lengths, widths and heights, depending on the intended application. In addition, anchor member 104, transition member 116 and blade support member 124 can represent different portions of the length L of support spine 100. For instance, in the present embodiment distal end 120 of transition member 116 occurs at or near a location corresponding to the counter tip of wind turbine blade 200 when support spine 100 is installed as in FIG. 4. In other embodiments, transition member 116 can extend further towards distal end 128, such that in an installed state a portion of transition member 116 would be received within blade cover 216. In such embodiments, transition member 116 can include fastener holes similar to fastener holes 130. Various methods of manufacturing support spine 100 can also be employed. In the present embodiment, support spine 100 can be milled from a single bar. In other embodiments, however, various molding techniques that occur to those skilled in the art can be used, as well as milling of separate components for later coupling.

In an additional variation, more than one wind turbine blade 200 can be supported on support spine 100, with a pre-defined space between each wind turbine blade 200. In such embodiments, blade support member 124 can be lengthened as necessary to accommodate additional wind turbine blades.

In yet another variation, a support spine can be manufactured from a rod rather than a bar. That is, anchor member 14 can have a substantially circular or elliptical cross-section. In such a variation, the cross-sections of transition member 116 and blade support member 124 can have shapes corresponding substantially to an arc of a circle (that is, a circle from which a segment has been removed).

Figure 7:
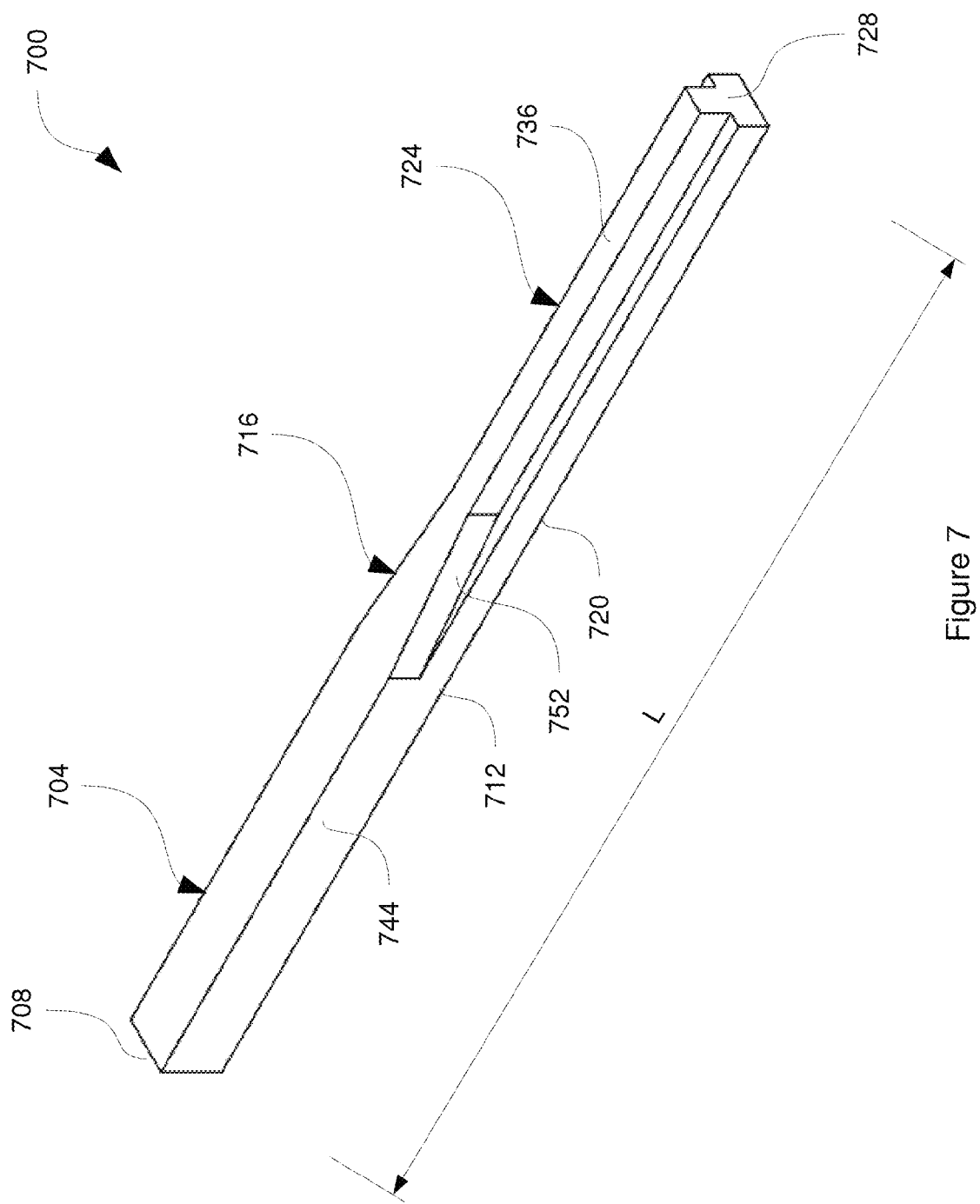
FIG. 7 depicts an isometric view of a support spine for a wind turbine blade, according to a second non-limiting embodiment.

Referring now to FIG. 7, an alternative embodiment of a support spine is depicted. Elements of FIG. 7 similar to those discussed earlier are identified with similar reference characters, using a leading "7" instead of a leading "1." Thus, a support spine 700 is shown having a length "L." Support spine 700 includes an anchor member 704 with a proximal end 708 and a distal end 712, as well as a transition member 716 with a proximal end (coinciding with distal end 712) and a distal end 720. Support spine 700 also includes a blade support member 724 having a proximal end and a distal end 728. As with support spine 100, the members of support spine 700 can be integrally formed from a single piece of material, or fabricated separately and coupled thereafter. Blade support member 724 and anchor member 704 can have fastener holes (not shown) for installation purposes.

Support spine 700 has a substantially planar lower surface 736 extending along its length, as well as an opposing, substantially parallel upper surface (not shown). In addition, support spine 700 has a substantially planar side surface 744 and a further opposing, substantially parallel side surface (not shown). The side surfaces of support spine 700 can be substantially perpendicular to the upper and lower surfaces.

Anchor member 704 can have a substantially rectangular transverse cross-section. In the particular embodiment shown in FIG. 7, anchor member 104 has a substantially square cross-section. Transition member 716 has a cross-sectional area that decreases along its length (from distal end 712 towards distal end 720). This reduction is achieved by a gradual reduction in the width of lower surface 736 and a single, discrete reduction in the height of side surface 744 at or near distal end 712 of anchor member 704. Following (that is, distally of) the discrete reduction, side surface 744 is no longer joined with lower surface 736 directly, but rather by a concave surface 752. A similar concave surface joins lower surface 736 and the opposing side surface (not shown). It will be noted that concave surface 752 is formed by a pair of substantially perpendicular surfaces. As discussed above, "concave" is used herein to broadly indicate a surface which tends towards the inside of support spine 700.

It will also be noted that, in contrast to support spine 100, following the discrete reduction in the height of side surface 744, no further change occurs in this height. Blade support member 724 therefore has a substantially T-shaped cross-section of substantially the same area along its length.

From the above description, certain advantages will now occur to those skilled in the art. For example, reducing the width and/or height of various surfaces of support spines 100 and 700 (thereby reducing cross-sectional area) allows for a strong structure near the rotor hub after installation, while also providing a more lightweight structure towards the distal end of the support spines. Despite being more lightweight, however, the greater width of the upper surfaces nonetheless provides sufficient contact area for a wind turbine blade. The overall structure of support spines 100 and 700 thus allows for reduced stresses on a rotor hub than would a uniform bar, while maintaining desirable strength and rigidity near the rotor hub.

Other advantages will also occur to those skilled in the art. As a further example, transition members 116 and 716 as described herein allow for the above-mentioned changes in cross-sectional area to take place gradually, without introducing stress concentrations that can result from sudden changes in geometry.

Persons skilled in the art will appreciate that there are yet more alternative implementations and modifications possible for implementing the embodiments, and that the above implementations and examples are only illustrations of one or more embodiments. For example, it will be appreciated by those skilled in the art that the support spines described herein can be implemented in a variety of ventilation fans in addition to wind turbines. It will also be appreciated that in a wind turbine, ventilation fan or other suitable configuration, support spines 100 and 700 can be used in combination with each other and with other support spines if desired. The scope, therefore, is only to be limited by the claims appended hereto.

I claim:

1. A support spine for a wind turbine blade, the support spine comprising:
    an anchor member having a proximal end and a distal end, at least a portion of the anchor member being configured for coupling to a rotor drum;
    a transition member extending from the distal end of the anchor member, the transition member having a distal end;
    a blade support member extending from the distal end of the transition member;
    substantially planar, substantially parallel opposing upper and lower surfaces, the upper and lower surfaces extending along the lengths of the anchor, transition and blade support members;
    a pair of substantially planar, substantially parallel opposing side surfaces substantially perpendicular to the upper and lower surfaces, the side surfaces extending along the lengths of the anchor, transition and blade support members;
    wherein the support spine has a reduced cross-sectional area at the distal end of the transition member than at the distal end of the anchor member, and wherein a width of the lower surface decreases along the length of the transition member.

2. The support spine of claim 1, further comprising:
    a pair of concave surfaces, each concave surface joining the lower surface with a different one of the side surfaces along the lengths of the transition and blade support members.

3. The support spine of claim 2, wherein a height of each of the side surfaces decreases along the length of the transition member in the direction of the distal end of the transition member.

4. The support spine of claim 3, wherein the heights of the side surfaces are substantially equal.

5. The support spine of claim 3, wherein the height of each of the side surfaces further decreases along the length of the blade support member in the direction of the distal end of the blade support member.

6. The support spine of claim 1, the anchor member having a substantially rectangular transverse cross-section.

7. The support spine of claim 3, the anchor member having a substantially square transverse cross-section.

8. The support spine of claim 1, wherein at least a portion of the upper surface of the blade support member is configured for contacting a wind turbine blade.

9. The support spine of claim 8, wherein the upper surface of the blade support member is configured for contacting more than one wind turbine blade.

10. The support spine of claim 1, wherein the blade support member comprises a plurality of fastener holes extending therethrough and arranged longitudinally along the blade support member.

11. The support spine of claim 1, wherein the anchor member, transition member and blade support member are integrally formed from a single piece of material.

12. The support spine of claim 11, wherein the material is selected from the group consisting of metal, plastic and wood.

13. The support spine of claim 11, wherein the material comprises a metal.

14. The support spine of claim 11, wherein the material comprises aluminum.

* * * * *